United States Patent
Marlia et al.

(10) Patent No.: US 10,654,374 B2
(45) Date of Patent: May 19, 2020

(54) ACTUATOR ASSEMBLY FOR A MOTOR VEHICLE WITH A BACKUP ENERGY SOURCE HAVING INTEGRATED BOOST/BUCK CONVERTER AND CHARGING SYSTEM

(71) Applicant: Magna Closures Inc., Newmarket (CA)

(72) Inventors: Marco Marlia, Pisa (IT); Marco Bartalucci, Castelfranco di Sotto (IT); Claudio Cambini, Florence (IT)

(73) Assignee: MAGNA CLOSURES INC., Newmarket, Ontario (CA)

( * ) Notice: Subject to any disclaimer, the term of this patent is extended or adjusted under 35 U.S.C. 154(b) by 177 days.

(21) Appl. No.: 15/597,267

(22) Filed: May 17, 2017

(65) Prior Publication Data

US 2017/0341526 A1    Nov. 30, 2017

Related U.S. Application Data

(60) Provisional application No. 62/342,468, filed on May 27, 2016.

(51) Int. Cl.
*B60L 3/00* (2019.01)
*B60L 58/12* (2019.01)
(Continued)

(52) U.S. Cl.
CPC ............... *B60L 58/12* (2019.02); *B60L 1/00* (2013.01); *B60L 3/0038* (2013.01);
(Continued)

(58) Field of Classification Search
USPC .......................................................... 307/67
See application file for complete search history.

(56) References Cited

U.S. PATENT DOCUMENTS

| 2008/0111423 A1* | 5/2008 | Baker | H02J 7/022 307/64 |
| 2015/0329009 A1* | 11/2015 | Dente | B60L 58/12 307/10.1 |
| 2016/0026205 A1* | 1/2016 | Song | H02J 7/0054 323/313 |

FOREIGN PATENT DOCUMENTS

| DE | 20121915 U1 | 10/2003 |
| EP | 0694664 A1 | 1/1996 |

(Continued)

*Primary Examiner* — Thienvu V Tran
*Assistant Examiner* — Brian K Baxter
(74) *Attorney, Agent, or Firm* — Dickinson Wright PLLC (57) ABSTRACT

An electronic control circuit with a backup energy source subassembly for an e-latch assembly and a method of operating the backup energy source subassembly are disclosed. The electronic control circuit includes a control unit including a computing module and a memory for electrically coupling to a plurality of sensors and to a main power source. The backup energy source subassembly is electrically coupled to the control unit for providing electrical energy to the electronic control circuit in response to one of a failure and interruption of the main power source. An output module is electrically connected to the backup energy source subassembly and to the main power source for driving an actuation group. The backup energy source subassembly includes a backup low voltage source and a boost-buck converter configured to selectively supply voltage to and selectively amplify voltage from the backup low voltage source.

20 Claims, 5 Drawing Sheets

(51) Int. Cl.
*B60L 1/00* (2006.01)
*E05B 81/86* (2014.01)
*H02J 7/34* (2006.01)
*H02J 9/00* (2006.01)

(52) U.S. Cl.
CPC ........... *B60L 3/0046* (2013.01); *B60L 3/0084* (2013.01); *E05B 81/86* (2013.01); *H02J 7/345* (2013.01); *B60L 2210/14* (2013.01); *H02J 9/002* (2013.01)

(56) References Cited

FOREIGN PATENT DOCUMENTS

| WO | WO-2014102279 A1 * | 7/2014 | ............. B60L 58/12 |
| WO | WO-2014102282 A1 * | 7/2014 | ............. B60L 58/12 |
| WO | WO-2014102283 A3 * | 9/2014 | ............. B60L 58/12 |

* cited by examiner

Fig-1

_Fig-2_

_Fig-3A_

ACTUATOR ASSEMBLY FOR A MOTOR VEHICLE WITH A BACKUP ENERGY SOURCE HAVING INTEGRATED BOOST/BUCK CONVERTER AND CHARGING SYSTEM

CROSS REFERENCE TO RELATED APPLICATION

This application claims the benefit of U.S. Provisional Application Ser. No. 62/342,468 filed May 27, 2016, which is incorporated herein by reference in its entirety.

FIELD

The present disclosure relates generally to an actuator assembly for a motor vehicle with a backup energy source having integrated boost-buck converter and charging system and a method of operating the boost/buck converter of the actuator assembly.

BACKGROUND

This section provides background information related to the present disclosure which is not necessarily prior art.

In the following description and the accompanying claims, the expression "closure device" will be used to generally indicate any element movable between an open position and a closed position, respectively opening and closing an access to an inner compartment of a motor vehicle, therefore including, boot, rear hatches, bonnet lid or other closed compartments, window regulators, sunroofs, in addition to the side doors of a motor vehicle, to which the following description will make explicit reference, purely by way of example.

It is known that actuator assemblies including electrical latches are provided in motor vehicles. Electrical latches can, for example control opening and closing of the side doors.

An electrical door latch generally includes a ratchet that is selectively rotatable with respect to a striker fixed to a door post, in order to latch and unlatch the door. The electrical door latch includes a pawl that selectively engages the ratchet to prevent the ratchet from rotating. The electrical door latch includes an electric motor, which is electrically connected to a main electric power supply of the vehicle (for example to the 12V battery of the same vehicle), in order to directly or indirectly drive the pawl, via an electrically-operated actuator.

As it is known, a common problem related to electrical latches is that of controlling, as it is also required by security regulations, opening and closing of the doors even in case of failure of the main power supply of the vehicle, or in case of interruptions or breaking of the electrical connection between the main power supply and the electric motor in the latch; this kind of situation may occur for example in case of an accident or crash involving the vehicle.

A possible solution to this problem envisages the use of a mechanical release mechanism in the latch, which serves as a manual backup to the electrically activated side door latch.

However, the presence of a redundant mechanical mechanism entails higher area occupation and weight and additional costs, and also represents a further constriction for designing the door.

Therefore, the use of a backup power source for the electrical latch has been proposed, in order to supply electrical energy to the electric motor of the latch, in case of failure or interruption of the vehicle main power supply.

This backup power source is usually kept in a charged state during normal operation, by the main power supply, so as to be readily available as soon as the need arises, for example in case of a crash or accident.

However, designing a backup power source and related electronic circuitry for the electric latch assembly has proven to be a difficult task due to size requirements, for example. The difficulty is also related to meeting desired electrical performance in terms of energy density or current output, especially in automotive operating conditions, for example.

In this respect, EP 0 694 664 A1 discloses a backup energy source for a door latch, designed to supply power to the latch during emergency situations, which includes an auxiliary battery arranged within the door where the latch is placed.

Another known solution, discussed in DE 201 21 915 U1, discloses the use of a capacitor group as a backup power source for a vehicle door latch. The capacitor group is coupled to a circuit board, externally connected to the latch assembly. The capacitor group includes a vast number of capacitors, of the high voltage type, series or parallel connected, thus requiring a relevant amount of space on the circuit board; moreover, such solution generally needs a further backup energy source, since the supercapacitor group may only be able to supply power for a limited amount of time. In other words, the capacitor group may not be able to guarantee a sufficient and autonomous backup energy source for the vehicle latch.

A need is therefore felt in the field for an optimized and reliable backup power source for an actuator assembly, such as an electric latch in a motor vehicle.

SUMMARY

This section provides a general summary of the present disclosure and is not intended to be interpreted as a comprehensive disclosure of its full scope or all of its features, aspects and objectives.

It is an aspect of the present disclosure to provide an electronic control circuit for an actuator assembly. The electronic control circuit includes a control unit including a computing module and a memory for electrically coupling to a plurality of sensors and to a main power source. A backup energy source subassembly is electrically coupled to the control unit for providing electrical energy to the electronic control circuit in response to one of a failure and interruption of the main power source. An output module is electrically connected to the backup energy source subassembly and to the main power source for driving the actuator assembly. The backup energy source subassembly includes a backup low voltage source and a boost-buck converter configured to selectively supply voltage to and selectively amplify voltage from the backup low voltage source.

According to another aspect of the disclosure, a backup energy source subassembly for an actuator assembly is provided. The backup energy source subassembly includes a backup low voltage source for selectively storing and supplying electrical energy to the actuator assembly. An inductor is electrically connected to the backup low voltage source for storing and releasing electrical energy. A first switch is electrically connected to the inductor. A second switch is electrically connected to the first switch and to a main power source. A microcontroller is electrically connected to the first switch and the second switch and configured to independently control switching of the first switch and the second switch in a buck mode to reduce a voltage from the main power source using the stored electrical energy in the inductor. Similarly, the microcontroller is also configured to independently control switching of the first switch and the second switch in a boost mode to boost a voltage from the backup low voltage source using the stored electrical energy in the inductor.

According to yet another aspect of the disclosure, a method of operating a backup energy source subassembly for an actuator assembly is provided. The method includes the step of supplying a voltage from a main power source to the backup energy source subassembly. Next, determining whether to operate the backup energy source subassembly in one of a boost mode and a buck mode. The method proceeds by turning a first switch of the backup energy source subassembly off in the buck mode. The next step is switching a second switch of the backup energy source subassembly alternately on and off using a microcontroller in the buck mode. The method continues by reducing a voltage from the main power source with a voltage across an inductor in response to the switching of the second switch in the buck mode and charging a backup low voltage source with the reduced voltage in the buck mode. The method also includes the step of turning the second switch off in the boost mode. Next, switching the first switch alternately on and off using the microcontroller in the boost mode. The method continues with the steps of boosting a voltage from the backup low voltage source with a voltage across the inductor in response to the switching of the first switch in the boost mode and supplying the boosted voltage to an actuation group.

These and other aspects and areas of applicability will become apparent from the description provided herein. The description and specific examples in this summary are intended for purpose of illustration only and are not intended to limit the scope of the present disclosure.

DRAWINGS

The drawings described herein are for illustrative purposes only of selected embodiments and not all implementations, and are not intended to limit the present disclosure to only that actually shown. With this in mind, various features and advantages of example embodiments of the present disclosure will become apparent from the following written description when considered in combination with the appended drawings, in which.

DESCRIPTION OF THE ENABLING EMBODIMENT

In the following description, details are set forth to provide an understanding of the present disclosure. In some instances, certain circuits, structures and techniques have not been described or shown in detail in order not to obscure the disclosure.

In general, the present disclosure relates to an actuator assembly for a motor vehicle of the type well-suited for use in many applications. The electronic control circuit for the actuator assembly of this disclosure will be described in conjunction with one or more example embodiments. However, the specific example embodiments disclosed are merely provided to describe the inventive concepts, features, advantages and objectives will sufficient clarity to permit those skilled in this art to understand and practice the disclosure.

According to aspects of the disclosure, the actuator assembly can be an electronic latch or e-latch assembly. Referring to the Figures, wherein like numerals indicate corresponding parts throughout the several views, an actuator or e-latch assembly 1 for a motor vehicle closure system with an electronic control circuit 10 including a backup energy source subassembly 20 having integrated boost-buck converter 24 and charging system and a method of operating the boost-buck converter 24 of the e-latch assembly 1 is provided.

Figure 1:
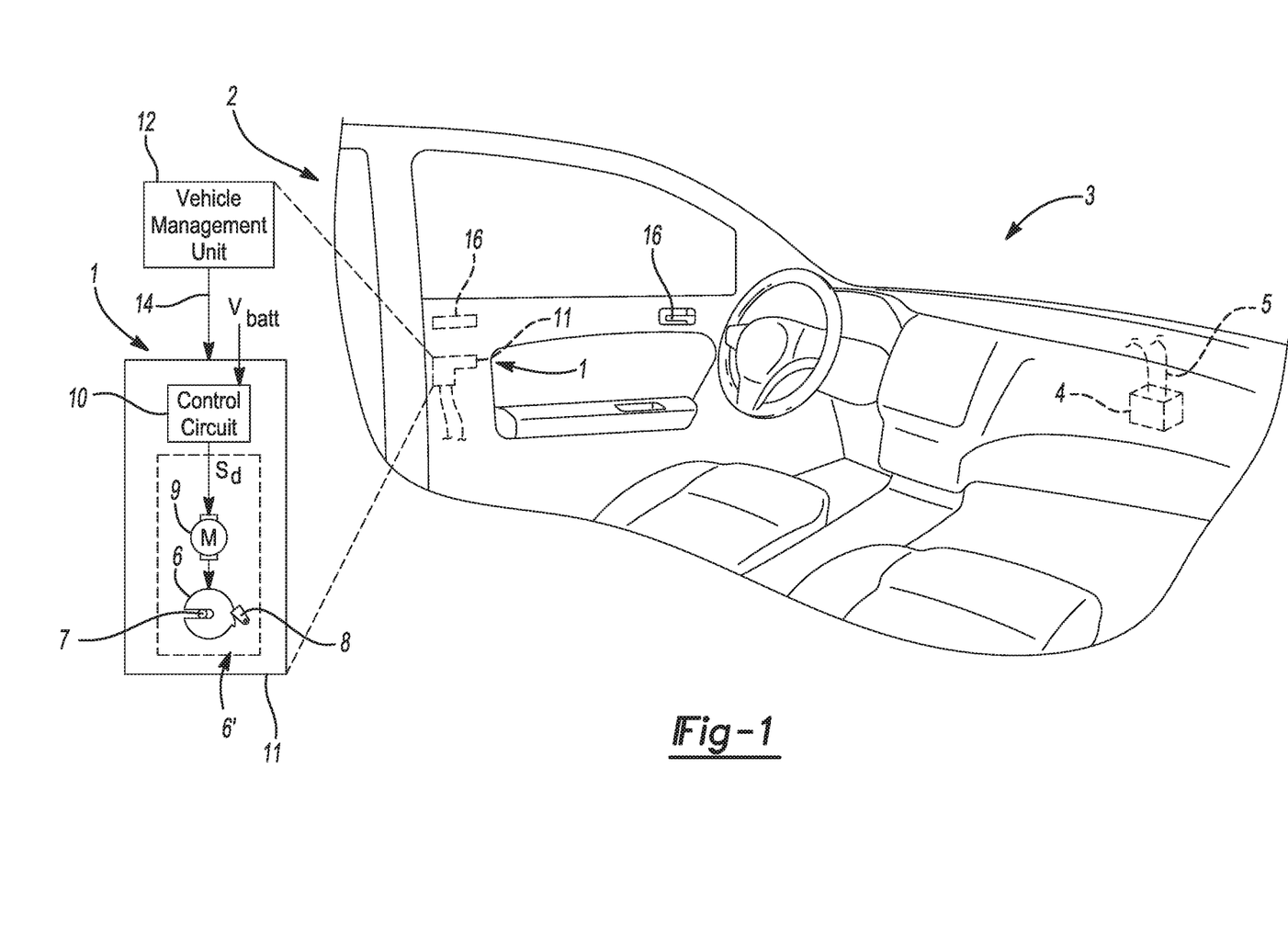
FIG. 1 is a schematic representation of a motor vehicle with a closure device and a related actuator assembly according to an aspect of the disclosure.

As best shown in FIG. 1, the e-latch assembly 1 is coupled to a side door 2 of a motor vehicle 3. However, it should be understood that the e-latch assembly 1 may equally be coupled to any kind of closure device of the motor vehicle 3. Additionally, while the specific embodiment of the actuator assembly disclosed is an e-latch assembly 1, it should be appreciated that the electronic control circuit 10 including the backup energy source subassembly 20 with integrated boost-buck converter 24 and charging system disclosed herein could be utilized in other actuator assemblies besides e-latch assembly 1.

The e-latch assembly 1 is electrically connected to a main power source 4 of the motor vehicle 3, for example a main battery providing a battery voltage $V_{batt}$ of 12 V, through an electrical connection element 5, for example a power cable (the main power source 4 may equally include a different source of electrical energy within the motor vehicle 3, for example an alternator).

The e-latch assembly 1 includes an actuation group 6', including an electric motor 9, operable to control actuation of the door 2 (or in general of the vehicle closure device).

In a possible embodiment, the actuation group 6' includes a ratchet 6, which is selectively rotatable to engage a striker 7 (fixed to the body of the motor vehicle 3, for example to the so called "A pillar" or "B pillar", in a manner not shown in detail). When the ratchet 6 is rotated into a latching position with respect to the striker 7, the side door 2 is in a closed operating state. A pawl 8 selectively engages the ratchet 6 to prevent it from rotating, driven by an electric motor 9 so as to move between an engaged position and a non-engaged position.

The e-latch assembly 1 further includes an electronic control circuit 10, for example including a microcontroller 26 or other known computing unit, which may be conveniently embedded and arranged in a same housing or case 11 (shown schematically) with the actuation group 6' of the e-latch assembly 1, thus providing an integrated compact and easy-to-assemble unit.

The electronic control circuit 10, as will be shown in more details in the following, is coupled to the electric motor 9 and provides driving signals $S_d$ thereto.

The electronic control circuit 10 is electrically coupled to a main vehicle management unit 12 (also known as main ECU or "vehicle body computer"), which is configured to control general operation of the motor vehicle 3, via a data bus 14, so as to exchange signals, data, commands and/or information.

Figure 2:
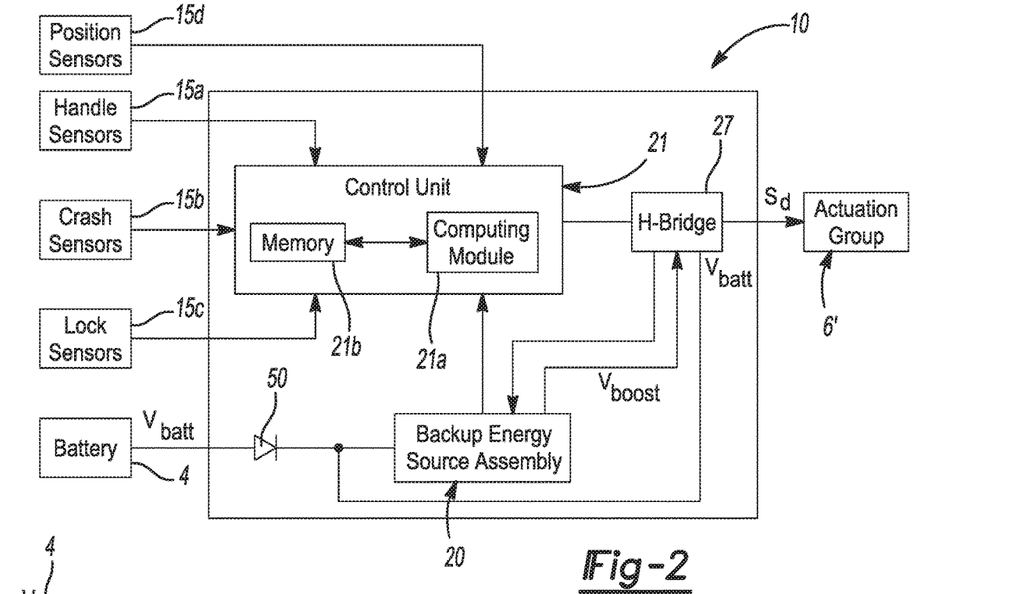
FIG. 2 is a general block diagram of an electronic control circuit of the actuator assembly of FIG. 1 according to an aspect of the disclosure.

Moreover, as shown also in FIG. 2, the electronic control circuit 10 is (directly, and/or indirectly via the vehicle management unit) coupled to several different sensors 15 (shown schematically) of the motor vehicle 3, such as: handle-reading sensors 15a (which read actuation of external and/or internal handles 16), crash sensors 15b, lock switch sensors 15c, and the like; conveniently, the electronic control circuit 10 also receives feedback information about the latch actuation from position sensors 15d, such as Hall sensors, configured to detect the operating position, for example of the ratchet 6 and/or pawl 8.

The electronic control circuit 10 is also coupled to the main power source 4 of the motor vehicle 3, so as to receive the battery voltage $V_{batt}$; the electronic control circuit 10 is thus able to check if the value of the battery voltage $V_{batt}$ decreases below a predetermined threshold value, to promptly determine if an emergency condition (when a backup energy source subassembly 20 may be needed) occurs.

As shown in the schematic block diagram of FIG. 2, the electronic control circuit 10 includes an embedded and integrated backup energy source subassembly 20, which is configured to supply electrical energy to the actuation group 6' and latch electric motor 9, and to the same electronic control circuit 10, in case of failure or interruption of the main power supply from the main power source 4 of the motor vehicle 3.

In more detail, the electronic control circuit 10 includes a control unit 21, for example provided with a microcontroller, microprocessor or analogous computing module 21a, coupled to the backup energy source subassembly 20 and the actuation group 6' of the e-latch assembly 1, to control their operation. The electronic control circuit 10 also includes an output module, such as H-bridge module 27. It should be understood that the output module may be an integrated circuit, be constructed of discrete components, or even integrated with other elements of the electronic control circuit 10.

The control unit 21 has an embedded memory 21b, for example a non-volatile random access memory 21b, coupled to the computing module 21a, storing suitable programs and computer instructions (for example in the form of a firmware). It is recognized that the control unit 21 may alternatively comprise a logical circuit of discrete components to carry out the functions of the computing module 21a and memory 21b.

According to an aspect of the disclosure, the backup energy source subassembly 20 for the e-latch assembly 1 includes a boost-buck converter 24 (FIGS. 3A-3C) coupled to a backup low voltage source 28 for selectively storing and supplying electrical energy to the e-latch assembly 1. Specifically, the boost-buck converter 24 can be configured to selectively supply voltage to and selectively amplify voltage from the backup low voltage source 28.

Figure 3A:
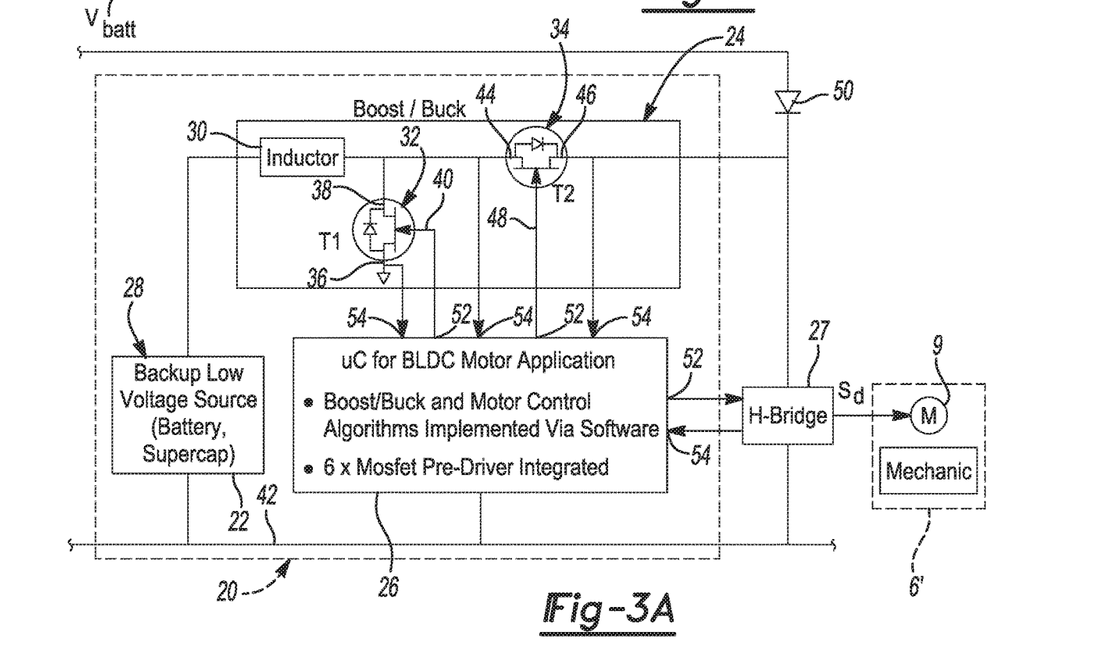
FIGS. 3A-3C are circuit diagrams of the backup energy source subassembly of the electronic control circuit of FIG. 2 according to an aspect of the disclosure.
Figure 3B:
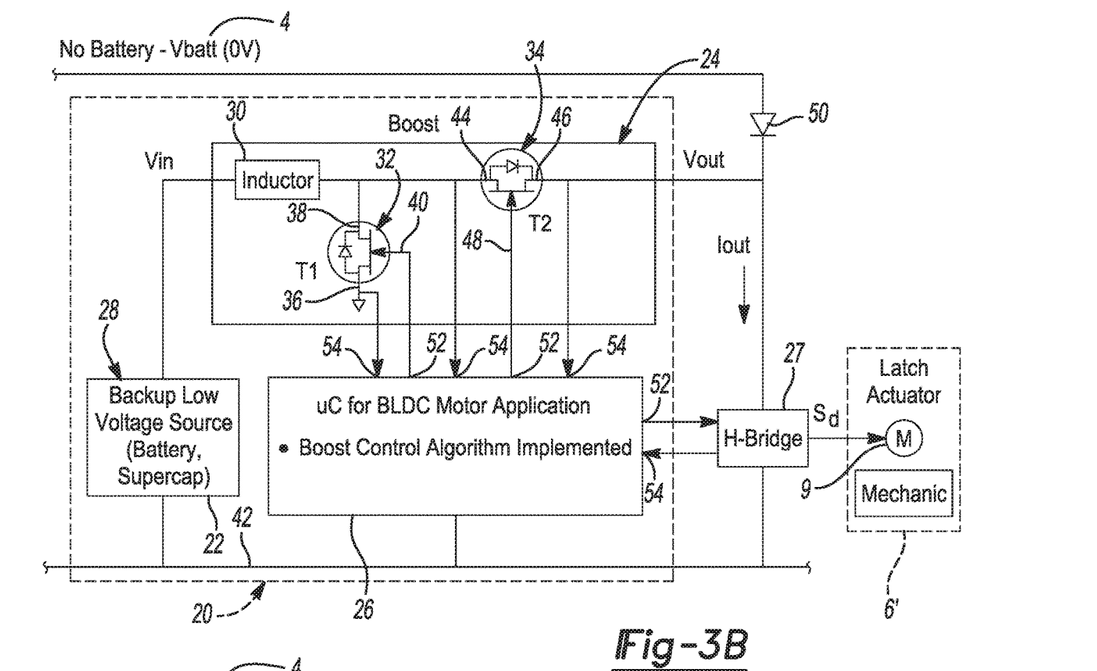
Figure 3C:
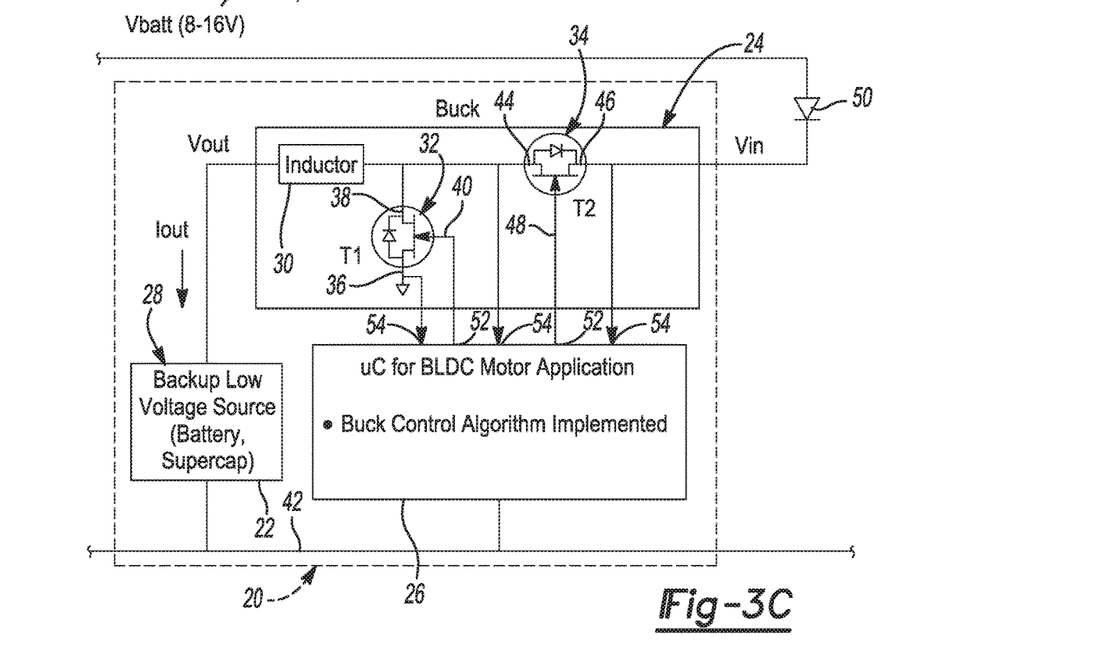

According to another aspect, the backup low voltage source 28 of the backup energy source subassembly 20 includes a group of low voltage supercapacitors 22 (hereinafter supercap group 22), as an energy supply unit (or energy tank) to provide power backup to the e-latch assembly 1, even in case of power failures. Supercapacitors may include electrolytic double layer capacitors, pseudocapacitors or a combination thereof. While the backup low voltage source 28 can include the supercap group 22, it should be appreciated that the backup low voltage source 28 can be a battery or other energy storage device.

Supercapacitors advantageously provide high energy density, high output current capability and have no memory effects; moreover, supercapacitors have small size and are easy to integrate, have extended temperature range, long lifetime and may withstand a very high number of charging cycles. Supercapacitors are not toxic and do not entail explosive or fire risks, thus being suited for hazardous conditions, such as for automotive applications.

In a possible embodiment, the supercap group 22 may include more than one supercapacitor cell connected in series, each providing, when charged, a voltage level for example of 2.5 V-2.7 V, in order to jointly provide a supercap voltage $V_{sc}$, for example in the order of 3 V-5 V, which may be used as a backup power supply, in emergency situations, when the energy from the main power source 4 of the motor vehicle 3 is not available. Supercapacitor cells may thus be of a low voltage type and also have a high capacity, for example in the order of 16 F-20 F, for example 18 F. It should be appreciated that the supercap group 22 can include any number of supercapacitor cells connected in any configuration.

The boost-buck converter 24 of the backup energy source subassembly 20 includes an inductor 30 that is electrically connected to the backup low voltage source 28 for storing and releasing electrical energy. A first switch 32 is also electrically connected to the inductor 30. A second switch 34 is electrically connected to the first switch 32 and to the main power source 4. According to an aspect, each of the switches 32, 34 is a metal-oxide-semiconductor field-effect transistor (MOSFET) or solid state switch. The first MOSFET switch 32 has switch terminals including a first source 36 and a first drain 38 and a first gate 40. The first source 36 of the first MOSFET switch 32 is electrically connected a ground node 42. The second MOSFET switch 34 has switch terminals including a second source 44 and a second drain 46 and a second gate 48. The first drain 38 of the first MOSFET switch 32 is electrically connected to the second source 44 of the second MOSFET switch 34. The second drain 46 of the second MOSFET switch 34 is also electrically connected to the main power source 4 and to the actuation group 6' of the e-latch assembly 1. A main power diode 50 is connected in between the main power source 4 and the second drain 46 to ensure current only flows away from the main power source 4 (i.e., its cathode terminal is connected to the second drain 46 and its anode terminal is connected to the main power source 4 for receiving $V_{batt}$). Each of the MOSFET switches 32, 34 also includes a body diode for reverse current protection. While the switches 32, 34 disclosed are MOSFET switches 32, 34, it should be appreciated that other types of switches 32, 34 may be utilized instead, such as, but not limited to bipolar junction transistors (BJT), insulated-gate bipolar transistors (IGBT) or other semiconductor switching devices.

A microcontroller 26 is electrically connected to the first MOSFET switch 32 and the second MOSFET switch 34 and is configured to independently control switching of the first MOSFET switch 32 and the second MOSFET switch 34. Specifically, the microcontroller 26 is configured to operate in a buck mode to reduce a voltage from the main power source 4 using the stored electrical energy in the inductor 30 and in a boost mode to boost a voltage from the backup low voltage source 28 using the stored electrical energy in the inductor 30. The microcontroller 26 has a plurality of output ports 52. The output ports 52 may include pre-drivers to shift the logic level and pre-drive high current loads. The first gate 40 of the first MOSFET switch 32 is electrically connected to one of the plurality of output ports 52 of the microcontroller 26 (e.g., including pre-drivers) for being selectively driven by the microcontroller 26. Likewise, the second gate 48 is electrically connected to one of the plurality of output ports 52 of the microcontroller 26 for being selectively driven by the microcontroller 26. The microcontroller 26 can be coupled to the backup low voltage source 28, to receive the supercap voltage $V_{sc}$, enabling the microcontroller 26 to operate autonomously, thereby making it possible to enable the backup energy source subassembly 20 even without any further action from the control unit 21 of the electronic control circuit 10. According to an aspect, the microcontroller 26 could be selected as one that typically is used for controlling brushless direct current (DC) motors or BLDC motors, for example, and can operate using a boost algorithm and a buck algorithm as well as controlling the electric motor 9 of the e-latch assembly 1.

The microcontroller 26 also has a plurality of input ports 54. The first source 36 of the first MOSFET switch 32 is electrically connected to one of the plurality of input ports 54 of the microcontroller 26 for monitoring a first voltage at the first source 36. The first drain 38 of the first MOSFET switch 32 is also electrically connected to one of the plurality of input ports 54 of the microcontroller 26 for monitoring a second voltage at the first drain 38. Similarly, the second drain 46 of the second MOSFET switch 34 is electrically connected to one of the plurality of input ports 54 of the microcontroller 26 for monitoring a third voltage at the second drain 46.

It should be appreciated that although the microcontroller 26 and control unit 21 may be separate (as shown in FIG. 2), microcontroller 26 could, for example, couple to the sensors 15 and carry out all of the functions of control unit 21. Thus, microcontroller 26 could replace control unit 21.

Figure 4:
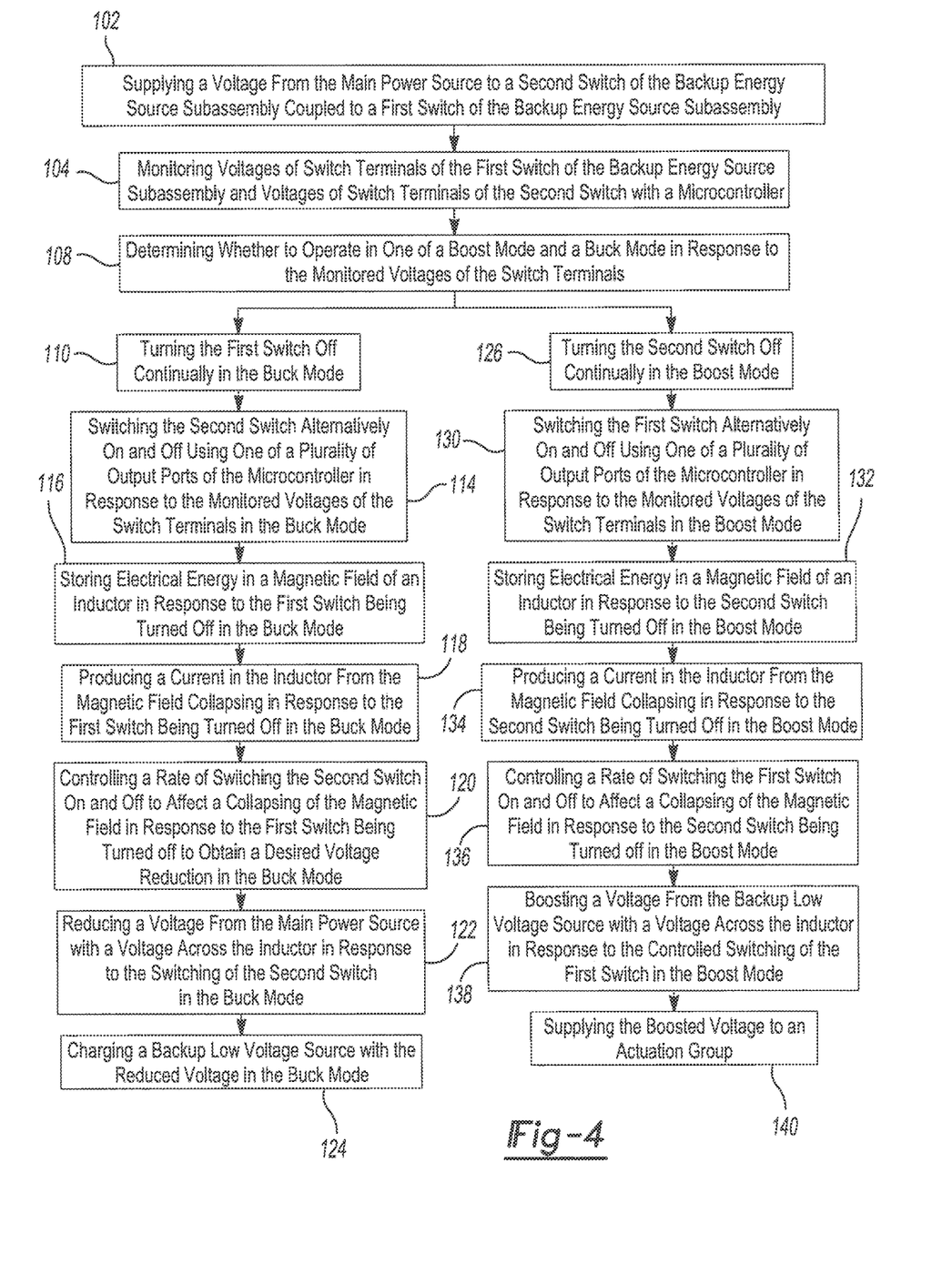
FIGS. 4 and 5 are flowcharts illustrating the steps of methods of operating the boost/buck converter of the actuator assembly according to aspects of the disclosure.
Figure 5:
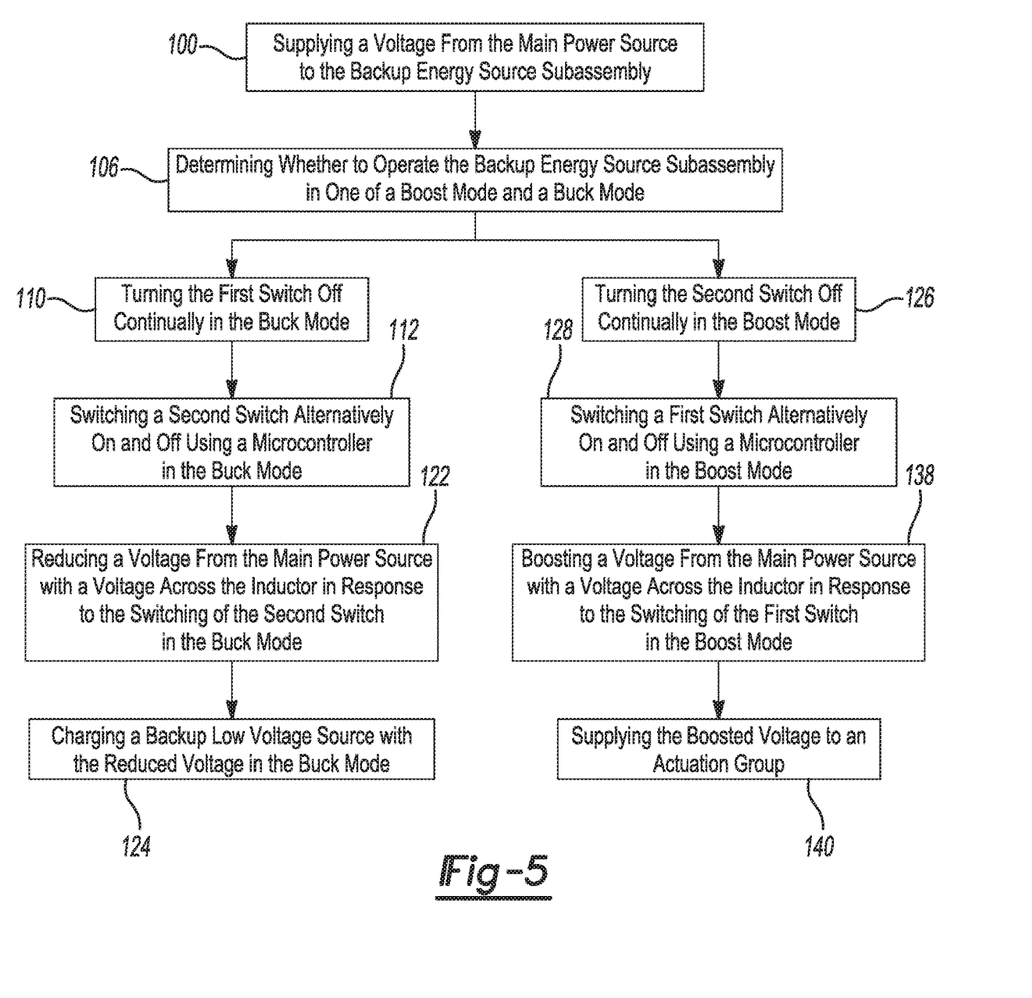

As illustrated in FIGS. 4 and 5, a method of operating the boost-buck converter 24 of the e-latch assembly 1 is also disclosed. The boost-buck converter 24 can readily reduce a voltage supplied by the main power source 4 to a backup low voltage source 28 as well as boost voltage from the backup low voltage source 28 as needed. The method includes the step of 100 supplying a voltage from the main power source 4 to the backup energy source subassembly 20. Specifically, this step can include 102 supplying a voltage from the main power source 4 to a second switch 34 (e.g., second MOSFET switch 34) of the backup energy source subassembly 20 coupled to a first switch 32 (e.g., first MOSFET switch 32) of the backup energy source subassembly 20. The step of 100 supplying a voltage from the main power source 4 to the backup energy source subassembly 20 can also include 104 monitoring voltages of switch terminals of the first switch 32 of the backup energy source subassembly 20 (e.g., source 36 and drain 38 of the first MOSFET switch 32) and switch terminals of the second switch 34 (e.g., source 44 and drain 46 of the second MOSFET switch 34) with a microcontroller 26. The method continues with 106 determining whether to operate the backup energy source subassembly 20 in one of a boost mode (e.g., when main power source 4 is unavailable and power is provided by the backup low voltage source 28) and a buck mode (e.g., when main power source 4 is available and charging the backup low voltage source 28). Such a step can be further defined as 108 determining whether to operate in one of a boost mode and a buck mode in response to the monitored voltages of the switch terminals (e.g., sources 36, 44 and drains 38, 46). For example, the microcontroller 26 can sense the level of voltage from the main power source 4, to determine which mode to utilize, for instance. Alternatively, the control unit 21 or another control device could instruct the microcontroller 26 which mode to operate in, for example.

In the buck mode (FIG. 3C), the method continues with 110 turning the first switch 32 off (e.g., off continually), The method proceeds with 112 switching a second switch 34 alternately on and off using a microcontroller 26 in the buck mode. This step can include 114 switching the second switch 34 alternately on and off using one of a plurality of output ports 52 of the microcontroller 26 in response to the monitored voltages of the switch terminals in the buck mode. For instance, the output port 52 of the microcontroller 26 could produce a high frequency square wave, quickly cycling the second switch 34 on and off. The step of 112 switching a second switch 34 alternately on and off using a microcontroller 26 in the buck mode can also include 116 storing electrical energy in a magnetic field of an inductor 30 in response to the first switch 32 being turned off in the buck mode. Additionally, 118 producing a current in the inductor 30 from the magnetic field collapsing in response to the first switch 32 being turned off in the buck mode. The method can also include the step of 120 controlling a rate of switching the second switch 34 on and off to affect a collapsing of the magnetic field in response to the first switch 32 being turned off to obtain a voltage reduction in the buck mode (e.g., to a desired voltage level). More specifically, when the second switch 34 is turned off and the magnetic field in the inductor 30 collapses, a back electromotive force (e.m.f.) is generated, reversing the polarity of the voltage across the inductor 30. These steps lead to 122 reducing a voltage from the main power source 4 ($V_{in}$) with a voltage across the inductor 30 in response to the switching of the second switch 34 in the buck mode. The switching can be adjusted as necessary, depending on the magnitude of the voltage reduction necessary. The method then includes the step of 124 charging a backup low voltage source 28 with the reduced voltage ($V_{out}$) in the buck mode (i.e., current $I_{out}$ flows into the backup low voltage source 28). The voltage reduction that occurs during the buck mode helps protect the backup low voltage source 28 from overcharging.

In the boost mode (FIG. 3B), the method includes the step of 126 turning the second switch 34 off (e.g., off continually). Next, 128 switching the first switch 32 alternately on and off using the microcontroller 26 in the boost mode. Specifically, this step can include 130 switching the first switch 32 alternately on and off using one of the plurality of output ports 52 of the microcontroller 26 in response to the monitored voltages of the switch terminals in the boost mode (e.g., the output port 52 of the microcontroller 26 can produce a high frequency square wave). The step of 128 switching the first switch 32 alternately on and off using the microcontroller 26 in the boost mode can also include 132 storing electrical energy in the magnetic field of the inductor 30 in response to the second switch 34 being turned off in the boost mode. In addition, 134 producing a current in the inductor 30 from the magnetic field collapsing in response to the second switch 34 being turned off in the boost mode. In detail, during the time in which the first switch 32 is on, current flows through the inductor 30 to ground (i.e., to ground node 42) to charge the magnetic field of the inductor 30. The method can additionally include the next step of 136 controlling a rate of switching the first switch 32 on and off to affect a collapsing of the magnetic field in response to the second switch 34 being turned off in the boost mode. When the first switch 32 is turned off, the magnetic field in the inductor 30 collapses and generates back electromotive force (e.m.f.), reversing the polarity of the voltage across the inductor 30. Because the polarity of the voltage across the inductor 30 has been reversed, it adds to the voltage from the backup low voltage source 28. These steps can then lead to 138 boosting a voltage from the backup low voltage source 28 (i.e., $V_{sc}$ or $V_{in}$) with a voltage across the inductor 30 in response to the controlled switching of the first switch 32 in the boost mode. The method concludes with the step of 140 supplying the boosted voltage ($V_{out}$) to an actuation group 6'. The boost-buck converter 24 receives at its input (i.e., at the inductor 30) the supercap voltage $V_{sc}$ ($V_{in}$) generated by the supercap group 22, and is configured to boost (i.e., increase), its value up to automotive standard voltages (for example 9 V-16 V), and to provide enough output current capability ($I_{out}$) to drive standard automotive electric motors 9, such as the electric motor 9 of the e-latch assembly 1. Indeed, the supercap voltage $V_{sc}$ may be too low to provide an effective back-up power source to directly drive the electric motor 9 in emergency situations, like lost or insufficient power supply from main power source 4 of the motor vehicle 3. Consequently, the actuation group 6' can be operated using a low voltage source having an output voltage below that ordinarily needed to operate the actuation group 6'.

The backup energy source subassembly 20 thus provides at its output a boosted voltage $V_{boost}$, as a function of the supercap voltage $V_{sc}$, in the boost mode. The boosted voltage $V_{boost}$ is then received by an output module of the electronic control circuit 10, for example, including the integrated H-bridge module 27, whose output drives the electric motor 9 of the e-latch assembly 1. The integrated H-bridge module 27 is connected to one of the plurality of output ports 52 as well as one of the plurality of input ports 54 of the microcontroller 26 to enable the microcontroller 26 to control the integrated H-bridge module 27.

The advantages of the discussed solution are clear from the foregoing description. In particular, a reliable backup energy source subassembly 20 is provided for automotive applications, for example to power the e-latch assembly 1 in case of failure of the main power source 4 of the motor vehicle 3, and/or in case of disconnection of the e-latch assembly 1 from the same main power source 4 (FIG. 3B).

The backup energy source subassembly 20 may be independently controlled by the microprocessor 26, and may also be activated and deactivated without any action from the main vehicle management unit 12 and the related control software.

The use of supercapacitors, in particular a reduced number thereof, and the associated electronic control circuit 10, result in the backup energy source subassembly 20 being available in an inexpensive, light and small package; the resultant size and form factor of the backup energy source subassembly 20 is such as to allow integration within the same case 11 of the e-latch assembly 1.

The use of supercapacitors may also allow the backup energy source subassembly 20 to achieve high energy density, high capacity and high output current capability, and avoids memory effects and minimize consumption and recharge time. The expected lifetime of the supercap group 22 is also very long, thus allowing the use thereof as a reliable backup energy source, without requiring additional backup power sources.

The use of low voltage supercapacitors, for example of the type commonly available in the market, may also provide for reduced cost of the actuator assembly or e-latch assembly 1 and improve its maintainability.

During the emergency situation, causing disabling of the operation of the (external and/or internal) handles 16 of the motor vehicle 3, or in general opening of the doors, may also be implemented by the microcontroller 26 by controlling any suitable physical disabling mechanism coupled to the doors and/or the handles 16 and/or the actuation group 6' thereof (the disabling mechanism being configured to mechanically prevent opening of the same doors).

Clearly, changes may be made to what is described and illustrated herein without, however, departing from the scope defined in the accompanying claims. The e-latch assembly 1 may operate any kind of different closure devices within the motor vehicle 3, for example. In general, the electronic control circuit 10 including the backup energy source subassembly 20 may be used also for other purposes, within the motor vehicle 3, or for different applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with an example switching system can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

What is claimed is:

1. An actuator assembly for a motor vehicle comprising:
   a backup energy source subassembly for providing electrical energy to said actuator assembly in response to one of a failure and interruption of a main power source;
   an output module electrically connected to said backup energy source subassembly and to the main power source for driving an actuation group of said actuator assembly; and
   said backup energy source subassembly including a backup low voltage source and a boost-buck converter configured to selectively supply voltage to and selectively amplify voltage from said backup low voltage source;
   said boost-buck converter including an inductor electrically connected to said backup low voltage source for storing and releasing electrical energy;
   said boost-buck converter including a first switch electrically connected to said inductor;
   said boost-buck converter including a second switch electrically connected to said first switch and to the main power source; and
   a microcontroller electrically coupled to the main power source and said backup low voltage source and said first switch and said second switch and configured to independently control switching of said first switch and said second switch in a buck mode to reduce a voltage from the main power source using the stored electrical energy in said inductor and in a boost mode to boost a voltage from said backup low voltage source using the stored electrical energy in said inductor.

2. The actuator assembly as set forth in claim 1, wherein said microcontroller is electrically coupled to a plurality of sensors and said first switch is a first MOSFET switch having a first source and a first drain and a first gate and said second switch is a second MOSFET switch having a second source and a second drain and a second gate and said microcontroller has a plurality of output ports and said first source of said first MOSFET switch is electrically connected a ground node and said first gate is electrically coupled to one of said plurality of output ports of said microcontroller for being selectively driven by said microcontroller and said first drain of said first MOSFET switch is electrically connected to said second source of said second MOSFET switch and said second gate is electrically connected to one of said plurality of output ports of said microcontroller for being selectively driven by said microcontroller and said second drain of said second MOSFET switch electrically connected to the main power source and to the actuator assembly.

3. The actuator assembly as set forth in claim 1, wherein said output module is an H-bridge module.

4. The actuator assembly as set forth in claim 1, wherein said microcontroller is configured to supply said actuation group from said backup energy source subassembly when there is a failure or interruption of the main power source such that energy from the main power source is not available.

5. A backup energy source subassembly for an actuator assembly comprising:
   a backup low voltage source for selectively storing and supplying electrical energy to the actuator assembly in response to one of a failure and interruption of a main power source;
   an inductor electrically connected to said backup low voltage source for storing and releasing electrical energy;
   a first switch electrically connected to said inductor;
   a second switch electrically connected to said first switch and to the main power source; and
   a microcontroller electrically coupled to the main power source and said backup low voltage source and said first switch and said second switch and configured to independently control switching of said first switch and said second switch in a buck mode to reduce a voltage from the main power source using the stored electrical energy in said inductor and in a boost mode to boost a voltage from said backup low voltage source using the stored electrical energy in said inductor.

6. The backup energy source subassembly as set forth in claim 5, wherein said first switch is a first MOSFET switch having a first source and a first drain and a first gate and said second switch is a second MOSFET switch having a second source and a second drain and a second gate and said microcontroller has a plurality of output ports and said first source of said first MOSFET switch is electrically connected a ground node and said first gate is electrically connected to one of said plurality of output ports of said microcontroller for being selectively driven by said microcontroller and said first drain of said first MOSFET switch is electrically connected to said second source of said second MOSFET switch and said second gate is electrically connected to one of said plurality of output ports of said microcontroller for being selectively driven by said microcontroller and said second drain of said second MOSFET switch is electrically connected to the main power source and to an actuation group of the actuator assembly.

7. The backup energy source subassembly as set forth in claim 6, wherein said microcontroller has a plurality of input ports and said first source of said first MOSFET switch is electrically connected to one of said plurality of input ports of said microcontroller for monitoring a first voltage at said first source.

8. The backup energy source subassembly as set forth in claim 7, wherein said first drain of said first MOSFET switch is electrically connected to one of said plurality of input ports of said microcontroller for monitoring a second voltage at said first drain.

9. The backup energy source subassembly as set forth in claim 7, wherein said second drain of said second MOSFET switch electrically connected to one of said plurality of input ports of said microcontroller for monitoring a third voltage at said second drain.

10. The backup energy source subassembly as set forth in claim 5, wherein said microcontroller is configured to supply the actuator assembly from said backup low voltage source when there is a failure or interruption of the main power source such that energy from the main power source is not available.

11. A method of operating a backup energy source subassembly for an actuator assembly to selectively store and supply electrical enemy to the actuator assembly in response to one of a failure and interruption of a main power source comprising the steps of:
supplying a voltage from the main power source to the backup energy source subassembly;
determining whether to operate the backup energy source subassembly in one of a boost mode and a buck mode;
turning a first switch of the backup energy source subassembly off in the buck mode;
switching a second switch of the backup energy source subassembly alternately on and off using a microcontroller in the buck mode;
reducing a voltage from the main power source with a voltage across an inductor in response to the switching of the second switch in the buck mode;
charging a backup low voltage source with the reduced voltage in the buck mode;
turning the second switch off in the boost mode;
switching the first switch alternately on and off using the microcontroller in the boost mode;
boosting a voltage from the backup low voltage source with a voltage across the inductor in response to the switching of the first switch in the boost mode; and
supplying the boosted voltage to the actuator assembly.

12. The method as set forth in claim 11, wherein the step of supplying a voltage from a main power source to the backup energy source subassembly is further defined as supplying a voltage from the main power source to a second switch of the backup energy source subassembly coupled a first switch of the backup energy source subassembly.

13. The method as set forth in claim 12, further including the step of monitoring voltages of switch terminals of the first switch and the second switch with the microcontroller and wherein the step of determining whether to operate the backup energy source subassembly in one of the boost mode and the buck mode is further defined as determining whether to operate in one of the boost mode and the buck mode in response to the monitored voltages of the switch terminals.

14. The method as set forth in claim 13, wherein the step of switching the second switch of the backup energy source subassembly alternately on and off using the microcontroller in the buck mode is further defined as switching the second switch alternately on and off using one of a plurality of output ports of the microcontroller in response to the monitored voltages of the switch terminals in the buck mode.

15. The method as set forth in claim 13, wherein the step of switching the first switch alternately on and off using the microcontroller in the boost mode is further defined as switching the first switch alternately on and off using one of a plurality of output ports of the microcontroller in response to the monitored voltages of the switch terminals in the boost mode.

16. The method as set forth in claim 11, wherein the step of switching the second switch of the backup energy source subassembly alternately on and off using the microcontroller in the buck mode includes storing electrical energy in a magnetic field of an inductor in response to the first switch being turned off in the buck mode and producing a current in the inductor from the magnetic field collapsing in response to the first switch being turned off in the buck mode.

17. The method as set forth in claim 11, wherein the step of reducing the voltage from the main power source with the voltage across an inductor in response to the switching of the second switch in the buck mode includes controlling the switching of the second switch on and off to affect a collapsing of the magnitude of a magnetic field of the inductor in response to the first switch being turned off to obtain a voltage reduction in the buck mode.

18. The method as set forth in claim 11, wherein the step of the step of switching the first switch alternately on and off using the microcontroller in the boost mode includes storing electrical energy in a magnetic field of the inductor in response to the second switch being turned off in the boost mode and producing a current in the inductor from the magnetic field collapsing in response to the second switch being turned off in the boost mode.

19. The method as set forth in claim 11, wherein the step of boosting the voltage from the main power source with the voltage across an inductor in response to the switching of the first switch in the boost mode includes controlling the switching of the first switch on and off to affect a collapsing of the magnitude of a magnetic field of the inductor in response to the second switch being turned off to obtain a voltage boost in the boost mode.

20. The method as set forth in claim 11, wherein the step of supplying the boosted voltage to the actuator assembly is further defined as supplying the boosted voltage to the actuator assembly when the main power source is not available.

* * * * *